March 30, 1965  E. F. MORENO ETAL  3,175,819
VEHICLE SUSPENSION MEANS
Filed Sept. 13, 1962  7 Sheets-Sheet 6
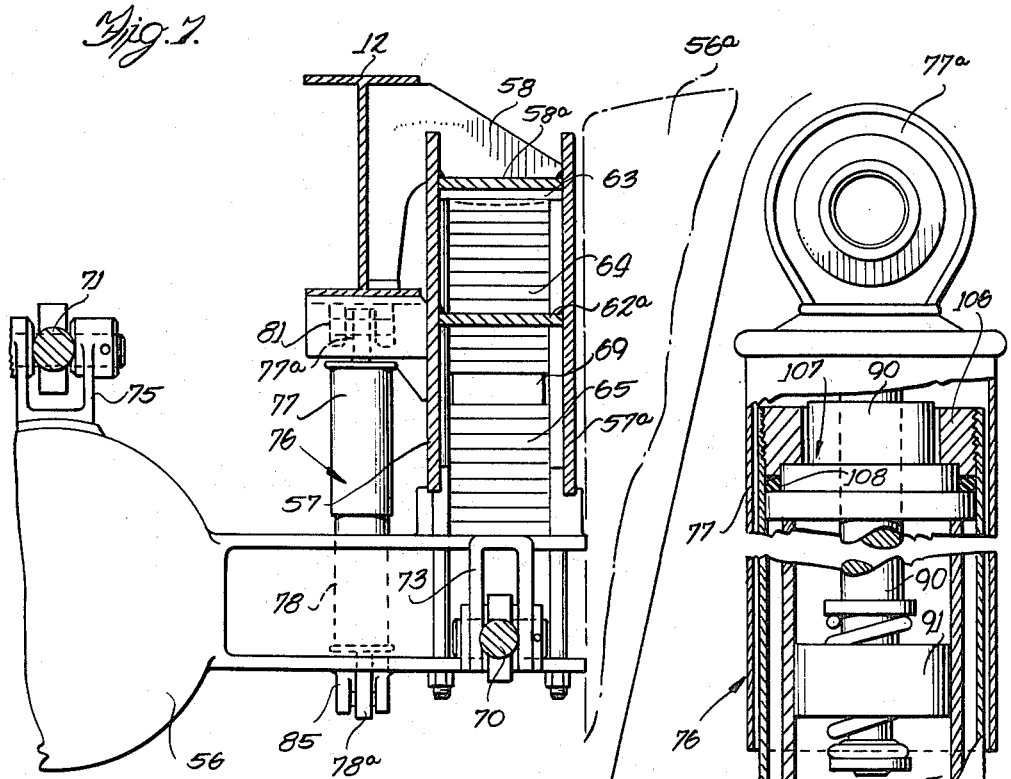
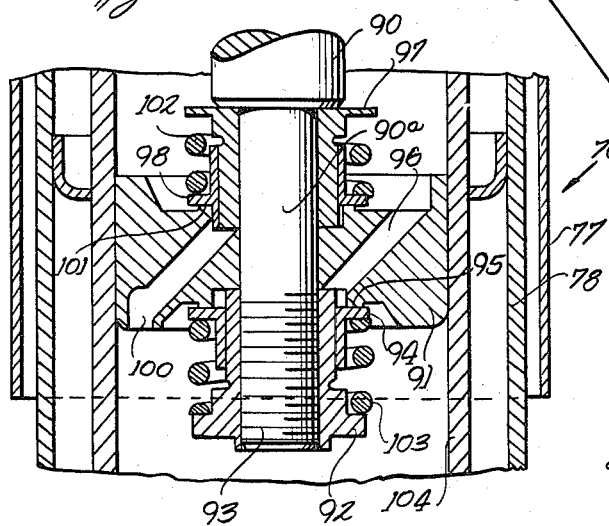
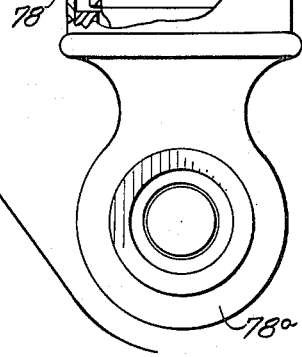
Inventors
Emil F. Moreno
E. A. Domes
Julius F. Marquart
Attorney March 30, 1965 E. F. MORENO ETAL 3,175,819
VEHICLE SUSPENSION MEANS
Filed Sept. 13, 1962 7 Sheets-Sheet 7
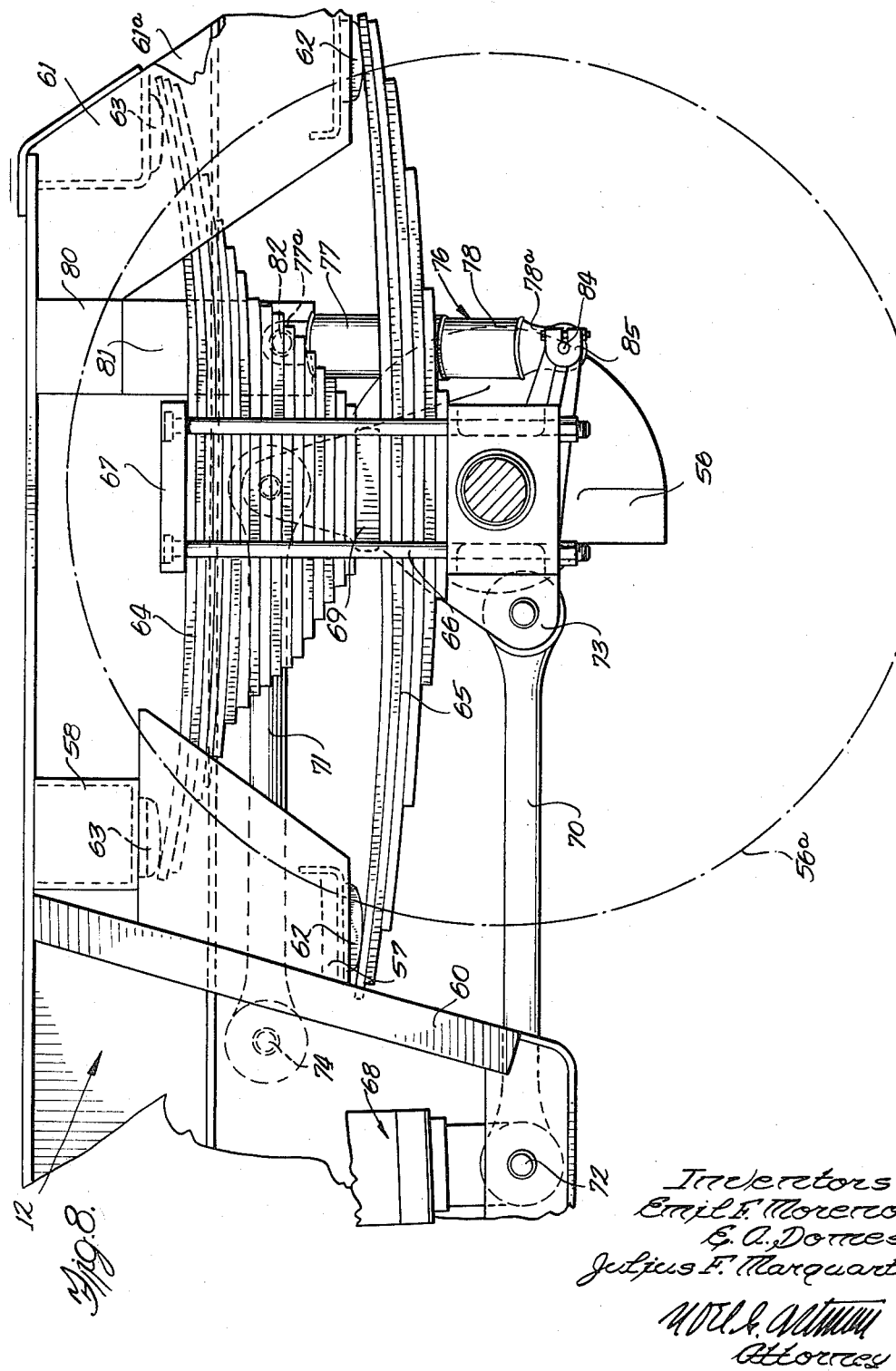

United States Patent Office 3,175,819
Patented Mar. 30, 1965

3,175,819
VEHICLE SUSPENSION MEANS
Emil F. Moreno, Melrose Park, E A Domes, Wheaton, and Julius F. Marquardt, Westchester, Ill., assignors to International Harvester Company, Chicago, Ill., a corporation of New Jersey
Filed Sept. 13, 1962, Ser. No. 223,440
1 Claim. (Cl. 267—56)

This invention relates to a vehicle suspension means for a vehicle including a chassis member and more particularly to a suspension means including a plurality of locating rods, a support means and a shock absorber for a wheel axle assembly having a leaf spring assembly attached thereto such that the leaf spring assembly engages at its outermost ends the support means extending from the chassis member of the vehicle. Further this invention more particularly provides the conventional shock absorber to dampen the extension and retraction movement of the suspended leaf spring wheel axle assembly during loading and further to limit the extension movement thereof. Finally this invention more particularly provides the plurality of locating rods operatively associated with the chassis member, the support means and the suspended axle assembly to maintain the position and to permit movement of the axle assembly during loading.

An object of this invention is to provide a vehicle suspension that includes a wheel axle assembly having attached thereto a leaf spring assembly engaged at its outermost ends to spaced-apart support means extending downwardly from the chassis member of the vehicle. In addition locating rods are pivotally connected to the wheel axle assembly and chassis member at their ends to maintain the longitudinal position of the leaf spring wheel axle assembly during loading. An extensible and retractable means is connected at its ends to the chassis member and the wheel axle assembly to thereby dampen and to downwardly limit the resilient movement of the leaf spring wheel axle assembly loading.

Another object of this invention is to provide a vehicle suspension means that includes a wheel axle assembly having attached thereto a leaf spring assembly which engages at its outermost ends longitudinally spaced-apart support means extending downwardly from the chassis member of the vehicle. The purpose of the support means is to permit resilient movement of the leaf spring wheel axle assembly during loadings thereon. Further a shock absorber of conventional construction is connected at its ends to the chassis member of the vehicle and the wheel assembly to dampen and to downwardly limit the resilient movement of the leaf spring wheel axle assembly during loading.

Further another object of the present invention is to provide a vehicle suspension means in connection with a vehicle including a chassis member and a wheel axle assembly. A plurality of transversely spaced-apart leaf springs are securely attached to the wheel axle assembly such that the outermost ends of the leaf springs engage spaced-apart support means extending downwardly from the chassis member that comprises a part of the vehicle suspension means. The vehicle suspension means further includes a conventional shock absorber means and a plurality of locating rods. The locating rods are pivotally connected at their opposite ends to the wheel axle assembly, two of the support means and the transverse center of the chassis member so that the position of the suspended wheel axle assembly is maintained between the support means during loading on the wheel axle assembly. The shock absorber means is pivotally connected at its ends to the chassis member and to the wheel axle assembly substantially between the spaced-apart support means extending downwardly from the chassis member. Although the spaced-apart support means and the pivotally connected locating rods permit extensible and retractable movement of the leaf spring axle assembly during loading thereon about a longitudinal and a transverse axis, the shock absorber means functions to dampen the extensible and retractable movement of the leaf spring wheel axle assembly relative to the chassis member and further functions to limit the extensible movement.

A feature of the present invention is to provide three locating rods pivotally connected at their ends to a suspended leaf spring wheel axle assembly, a transverse center of a chassis member, and two of the spaced-apart support means extending from the chassis member. These locating rods are pivotally connected in such a manner to be parallel to each other. Further the three locating rods are so positioned that upon passing a vertical plane therethrough the three locating rods are geometrically spaced to define a triangle.

Another feature of the present invention is to provide a support means of a chassis member that comprises a part of a vehicle suspension means so shaped that the support means engages the outermost ends of the leaf spring wheel axle assembly to permit extensible and retractable movement of the wheel axle assembly during loading and to limit transverse movement of the leaf spring axle assembly also during this loading.

Other objects and features of the present invention will be apparent upon a perusal of the following specification and drawing of which:

FIGURE 6 is a transverse elevational view along section line 6—6 of FIGURE 1 to show a fragmentary portion of the rear axle assembly chassis member and support means drawn to a larger scale than FIGURE 3;

FIGURE 7 is an elevational view along section line 7—7 of FIGURE 1 illustrating the rear axle assembly suspension;

FIGURE 8 is a side elevational view of the rear axle suspension;

FIGURE 9 is an enlarged view partly in cross section of the shock absorber; and

FIGURE 10 is an enlarged cross sectional of the shock absorber piston.

The present embodiment is the preferred embodiment but it is to be understood that changes can be made in the present embodiment by one skilled in the art without departing from the spirit and scope of the present invention.

For a general description of the present invention reference is made of the drawings.

An off-the-road vehicle includes an operator's compartment and dumpable dump body supported over a chassis member. Front and rear wheel axle assemblies are located transversely to the longitudinal axis of the chassis member with the front wheel axle assembly positioned below the forward end of the dump body and the rear wheel axle assembly positioned below the dump body at the rear end of the chassis member. The front wheel axle assembly is the steerable driving axle and includes a leaf spring assembly attached thereto which engages at its outermost ends spaced-apart support means extending downwardly from the chassis member. The rear wheel axle assembly is a driving axle only and also includes a leaf spring assembly attached thereto which engages at its outermost ends similarly spaced-apart support means extending downwardly from the chassis member. The support means of the front and rear axle assemblies are so shaped in addition to engaging the outermost ends of the attached leaf spring assemblies to also limit the transverse movement of the two axle assemblies. Both wheel axle assemblies include locating rods pivotally connected at their ends to their wheel axle assemblies, two of the support means and the chassis member. There are three locating rods in which their pivotal connection is provided by bifurcated brackets and a conventional pin assembly. The purpose of the locating rods is to maintain the longitudinal position of the wheel axle assemblies substantially between the support means on the chassis member during loadings on the wheels. The three locating rods are positioned and spaced apart parallel to each other and are further positioned such that if a vertical plane is passed therethrough a geometrical triangle is defined by the three rods. Shock absorbers are connected at their ends to the wheel axle assembly and the chassis member and function during any loading on the wheel axle to dampen the extensible or retractable movement of the suspended wheel-axle leaf spring relative to the chassis member and further to limit the extensible movement thereof. The connected shock absorbers are located substantially between the spaced-apart support means. Although the above generally described vehicle suspension means is an off-the-road type, it is not intended that the vehicle suspension means be limited thereto.

Figure 1:
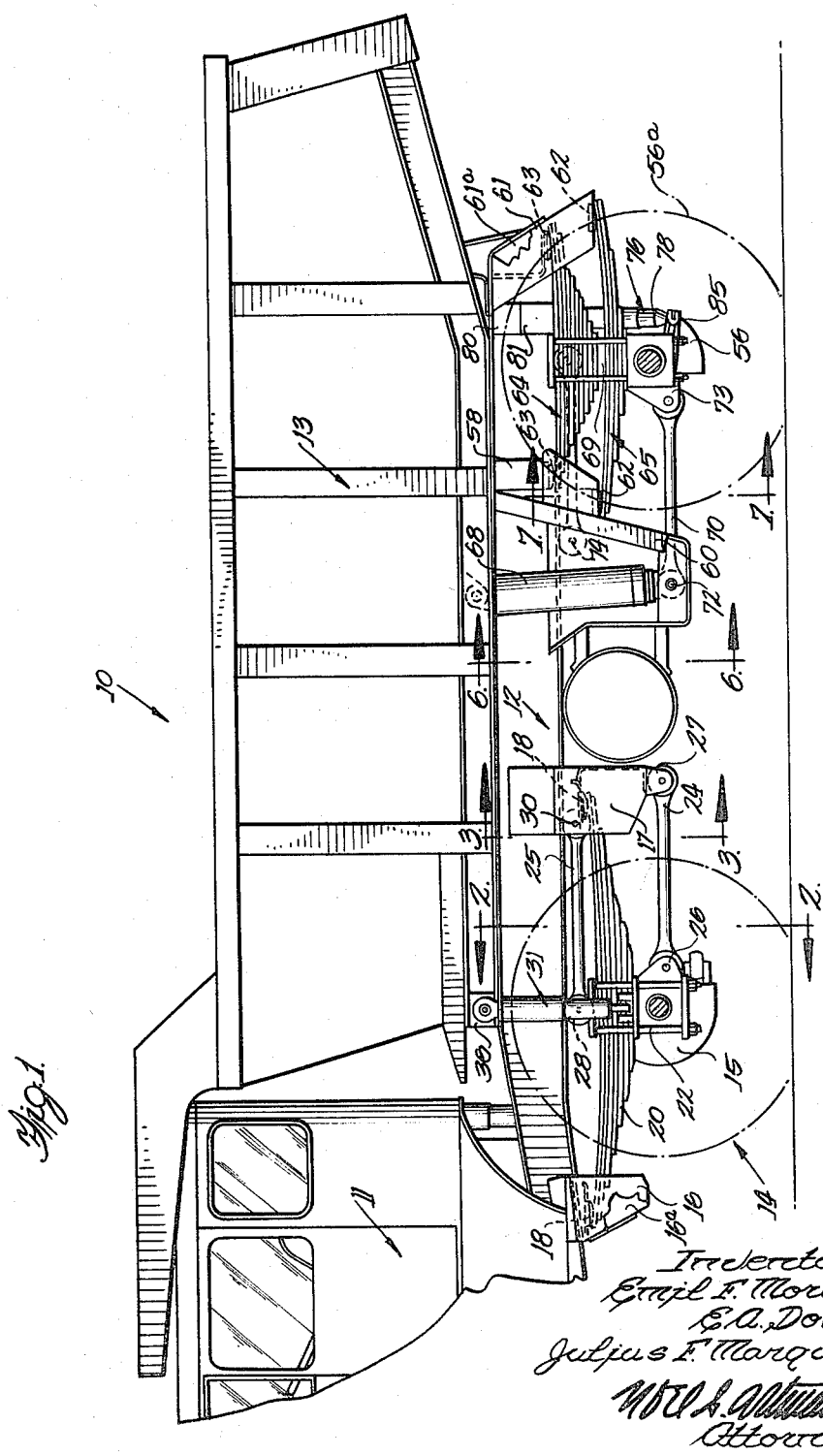
FIGURE 1 is a side elevational view of an off-the-road vehicle illustrating the suspension of the front and rear wheel axle assemblies.

Turning next to a detailed description of the present invention continued reference is made to the drawings. As shown in FIGURE 1 an off-the-road vehicle 10 comprises an operator's cab 11 and dump body 13 supported above a chassis member 12. A front wheel driving axle assembly 14 that is steerable is positioned transverse to the longitudinal axis of and longitudinally below chassis member 12 and located substantially below the forward end of the dump body 13 and the backward portion of the operator's cab 11.

Figure 3:
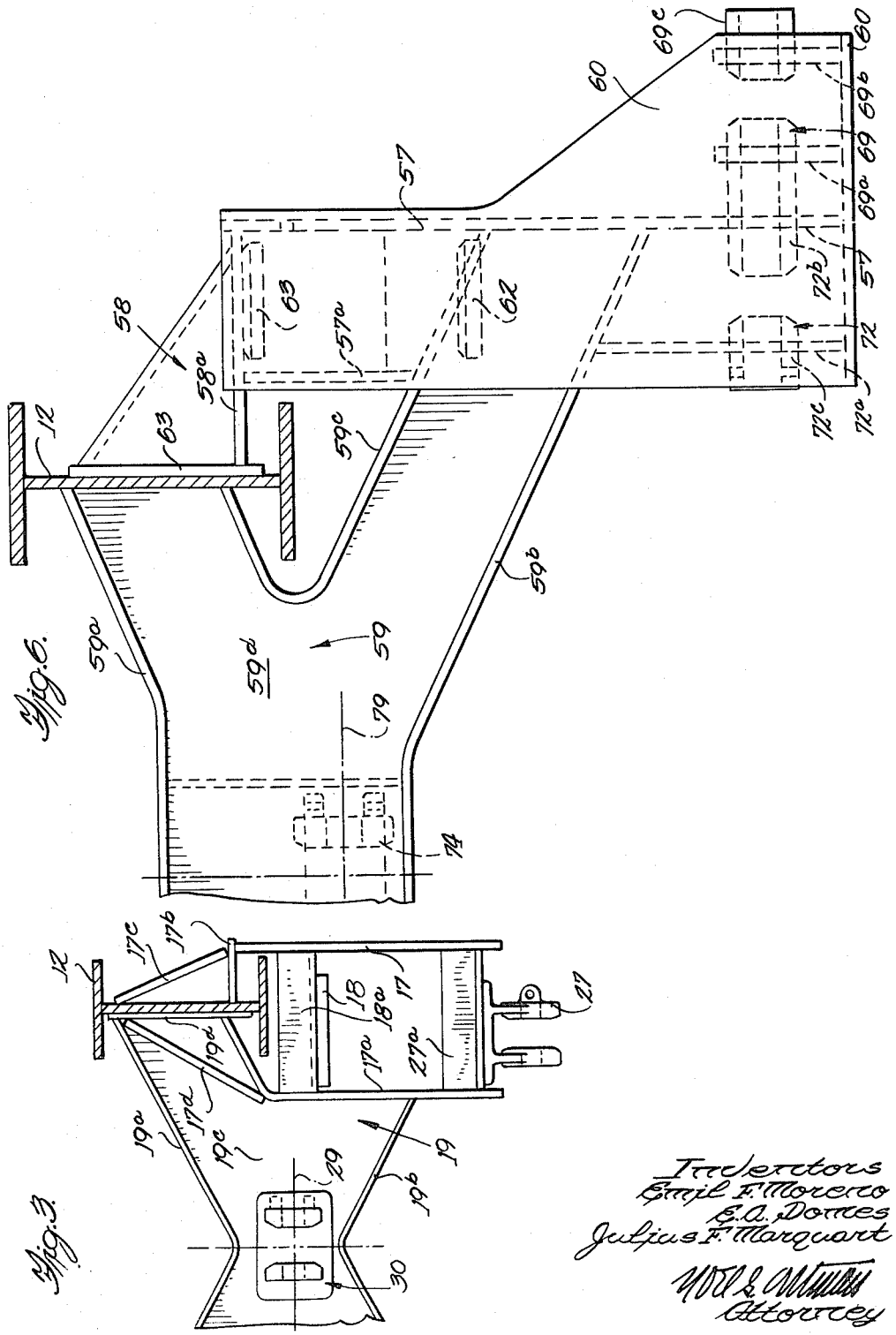
FIGURE 3 is a transverse elevational view along section line 3—3 of FIGURE 1 to show a fragmentary portion of the front axle assembly chassis member and support means.
Figure 4:
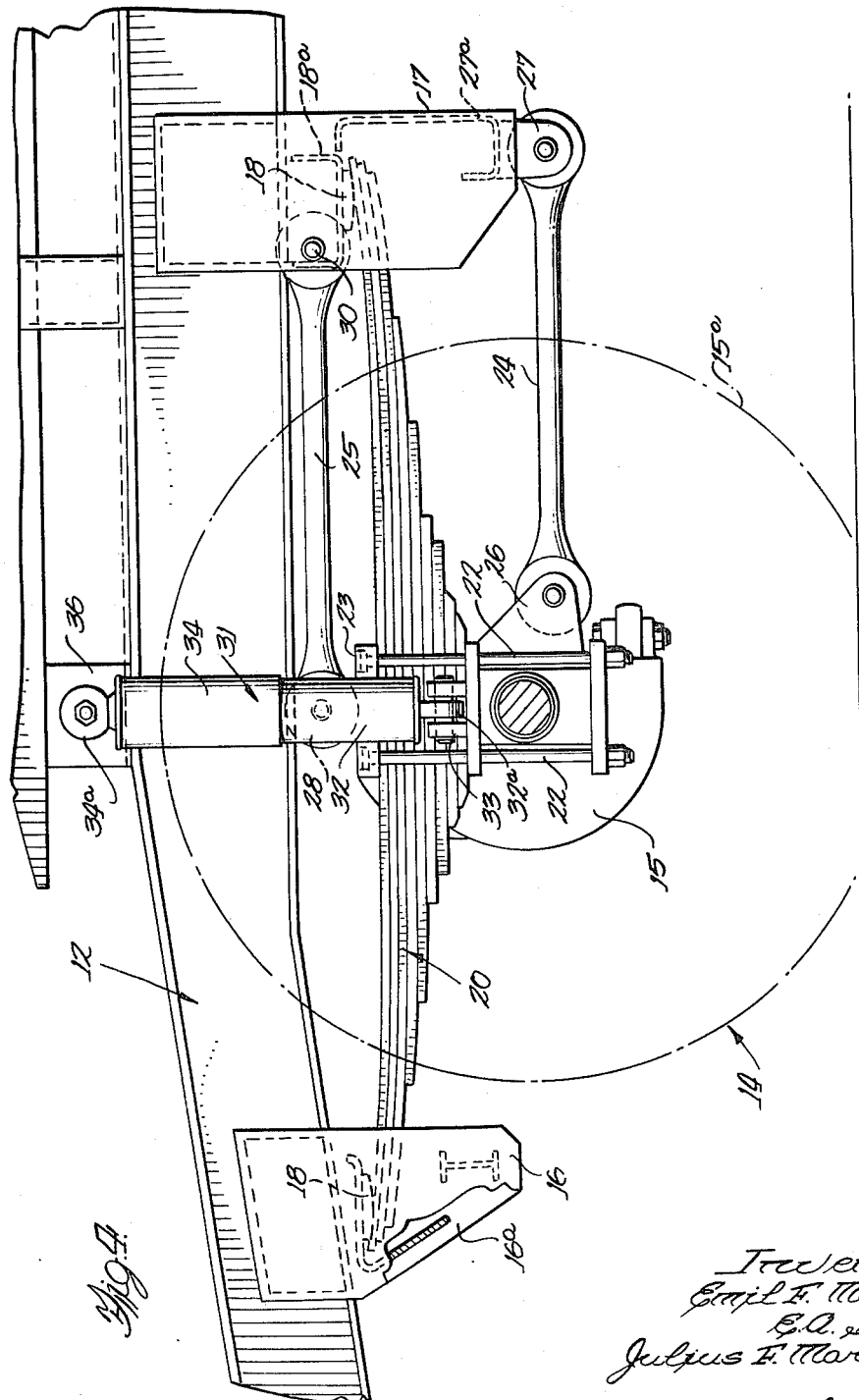
FIGURE 4 is an enlarged side elevational view of the front axle assembly suspension.
Figure 5:
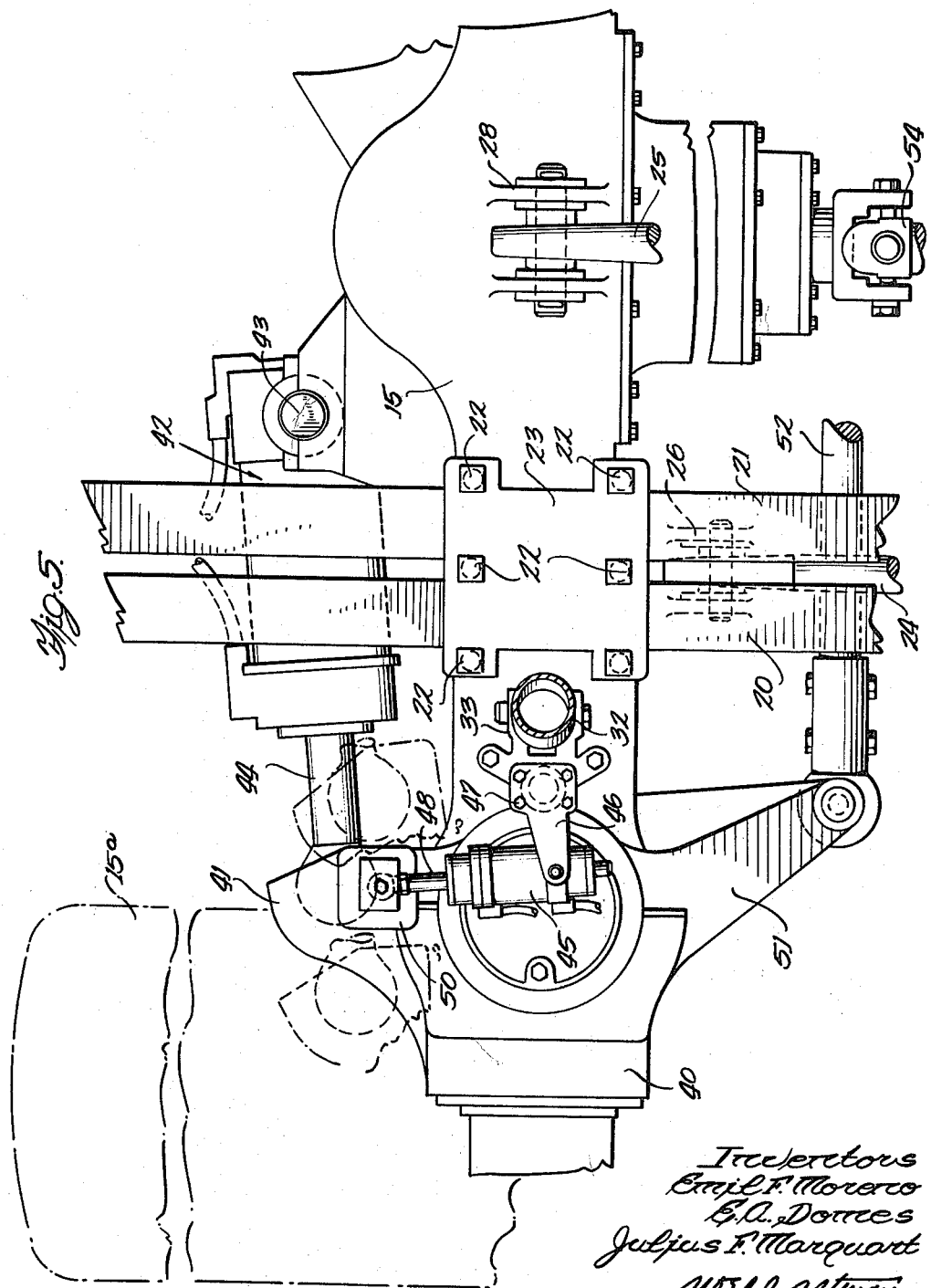
FIGURE 5 is a top plan view of the front axle assembly suspension.

Spaced-apart support means are located along and extend below its chassis member 12 best illustrated in FIGURES 1, 3 and 4. The support means include outer plate members 16 and 17 and inner plate members 16a (partially shown) and 17a that provide support for transverse plate members such as 18a in FIGURE 3 that mount support pads 18. The transverse detail of the rearward support means including the plate members 17 and 17a is best shown in FIGURE 3. The outer plate member 17 is suitably attached to the chassis member 12 through connecting plate members 17b and 17c. The inner plate member 17a is formed somewhat of an L-shape and suitably connected to the chassis member 12 through flat plate members 17d and 19d. Transverse member 18a of channel shape is suitably attached to the inside surfaces of the members 17a and 17 by such means as welding and has mounted thereto a support pad 18 which is engaged by the outermost end of the leaf spring assemblies 20 and 21 as shown in FIGURE 4. It should be noted here that another channel shaped member 27a is similarly secured transversely to the inside surfaces of the plate members 17 and 17a. The channel member 27a has secured thereto a bifurcated bracket 27. Thus it can be readily seen that the outermost ends of the leaf spring assemblies 20 and 21 slidably engage the surface of support pads 18 in the support means 16 and 17. The inner and outer plate members 16 and 16a, 17 and 17a function to limit the transverse or lateral movement of the leaf springs 20 and 21 and thereby serve to keep the axle assembly 14 centered under the chassis 12.

Only the transverse detail of the rear support means 17 has been shown in FIGURE 3; it is to be understood that the front support means 16 is similarly shaped and attached as an assembly to the chassis member 12. However, for the purpose of the subject invention it is sufficient to note that a fragmentary portion of the inner plate member 16a has been shown in FIGURES 1 and 4.

The front wheel axle housing 15 includes at its outermost ends pneumatic tires 15a. It further includes a pair of transversely spaced-apart leaf springs 20 and 21 attached thereto by a plurality of bolt-nut fasteners 22 passing through a series of openings in the axle housing 15 and an upper securing plate 23 also having fastener openings. The attachment of the leaf springs 20 and 21 to the front axle 15 through the fasteners 22 and the securing plate 23 is done in a conventional manner. The outermost ends of the leaf springs 20 and 21 extend within the support means such as the outer plate members 16 and 17 and inner plate members 16a and 17a to engage the surface of the support pads 18.

In order to maintain a longitudinal position of the front wheel axle assembly 14 during loading thereon substantially intermediately between the support means 16 and 17 relative to the chassis member 12, a plurality of substantially identical locating rods are pivotally connected at their ends. A lower locating rod is universally connected to a bifurcated bracket 26 integrally formed and extending from the rearward side of the front axle housing 15. The other end of the locating rod 24 is universally connected to the bifurcated bracket 27 previously described that extends downwardly from the rear support means having the outer support plate member 17.

To universally connect one end of an upper locating rod 25 an I-shaped transverse member 19 best shown in FIGURE 3 is connected to the chassis member 12 and the inner plate member 17a of the rear support means. Although in FIGURE 3 the member 19 is only partially shown it should be readily apparent that it comprises upper and lower V-shaped flange members 19a and 19b interconnected by a flat plate member 19c. At the transverse center of the member 19 a bifurcated bracket 30 is suitably mounted as shown to pivotally connect through a universal or ball joint assembly one end of the upper locating rod 25. The other end of the upper locating rod 25 is universally or ball joint connected to the transverse center of the front axle housing 15 to a bifurcated bracket 28 integrally formed and extending upwardly therefrom. Although only lower locating rod 24 has been described it should be readily apparent that there is another corresponding locating rod 24 to the other rear support means not shown in FIGURE 3 and that there is only one upper locating rod 25. It should now be further noted that the three locating rods 24, 24 and 25 are spaced in such a manner to be parallel to each other and further geometrically spaced in such a manner that if a vertical plane is passed therethrough the three locating rods form an isosceles triangle. Thus the locating rods universally connected to the wheel axle housing, both of the rear support means, and chassis member maintain the front axle assembly 14 substantially between the support means 16 and 17 by permitting resilient movement of the leaf springs 20 and 21 relative to the chassis member 12 during loading thereon. Since the rods are universally connected the axle may rotate about a longitudinal axis with respect to the chassis.

Figure 2:
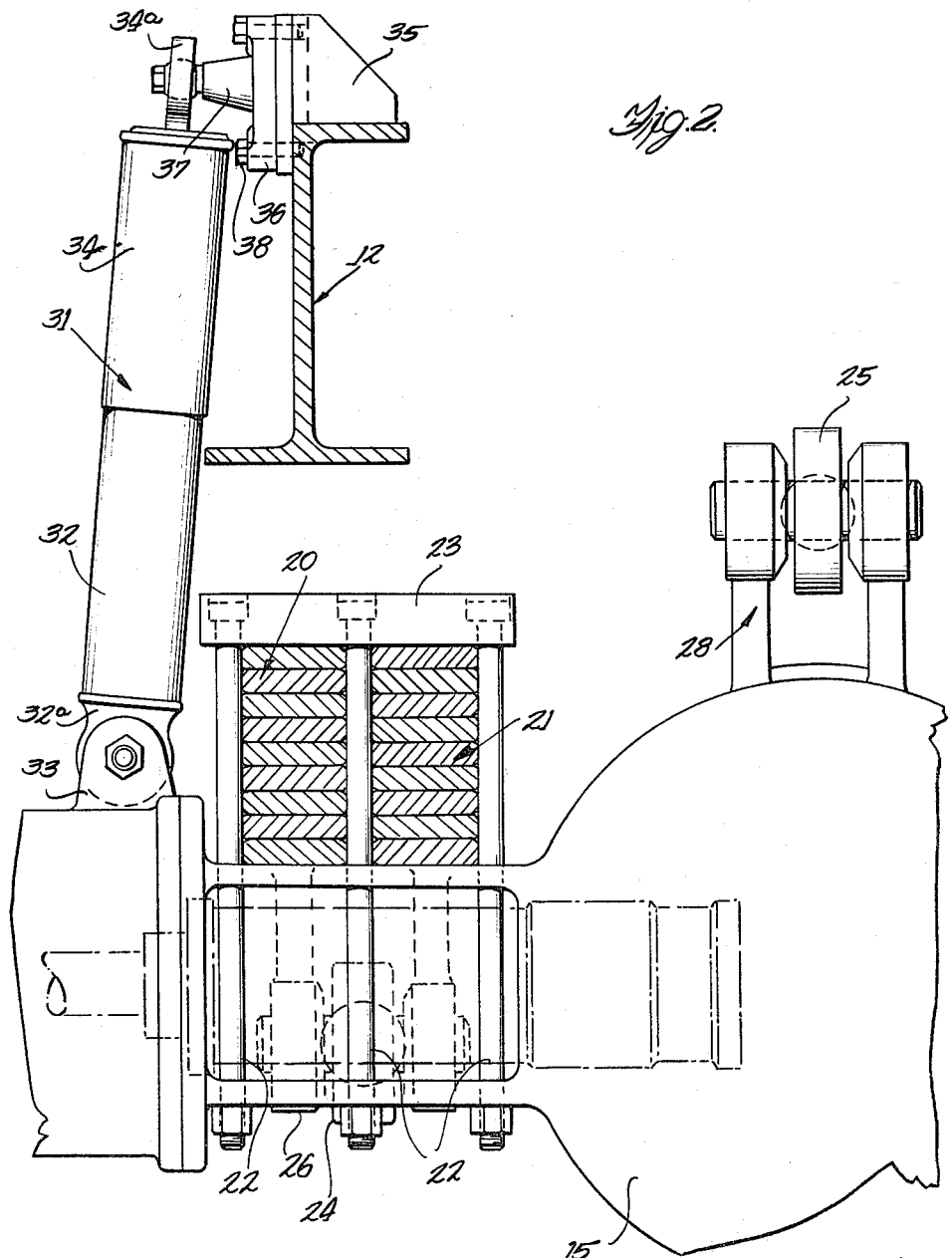
FIGURE 2 is a sectional elevational view along section 2—2 of FIGURE 1 illustrating details of the front axle assembly suspension.

During any change in loading on the front wheels 15a the front axle 15 including its attached leaf spring assemblies 20 and 21 tend to oscillate relative to the member 12 as well as rotary movement of the axle about a transverse axis thereof due to the universal connections of rods 24 and 25 at 27 and 30. In order to limit and to dampen this resilient and rotary movement, an extensible and retractable shock absorber 31 has been provided. As best shown in FIGURES 2 and 4 the shock absorber 31 comprises two telescopic cylindrical sections 32 and 34 with the section 34 being the larger diameter. The section 32 includes an extension portion 32a that pivotally connects to a bifurcated bracket 33 integrally formed and extending upwardly from the axle housing 15. The pivotal connection of the portion 32a and the bracket 33 is by a conventional pin means. A T-shaped bracket 35 is suitably fastened such as by welding to the chassis member 12 and provides a flat lateral surface for the attachment of another bracket 36 that includes an outwardly projection portion 37 having a spherical shaped journal surface for the pivotal connection of the extension portion 34a of the larger section 34. Thus during resilient movement of the leaf spring assemblies 20–21 the pivotally connected shock absorber 31 limits the extensible movement of the front axle housing 15 and further dampens the extensible and retractive movement of the front axle housing 15 relative to the chassis member 12.

The front axle 15 is the steerable driving axle and includes an outer steerable arm 40 pivotally connected thereto in a conventional manner such as by a kingpin. The steerable arm 40 which mounts the wheels 15a includes a forwardly extending portion 41 that is connected to a ball portion formed on the outer end of a rod 44 which comprises a part of a fluid actuator 42 pivotally connected to the front axle housing 15 through a pin 43. A fluid sensor 45 is pivotally connected to a bracket 46 securely fastened to the outer end of the axle housing 15 by suitable means such as bolt fasteners 47. The outer end of the rod 48 of the sensor 45 is pivotally connected to a bracket 50 suitably attached to the forward portion 41 of the steerable arm 40. A rearward extending portion 51 from the steerable arm 40 is pivotally connected to a tie rod 52. Although the pivotally connected steerable arm 40 including connected actuator 42 and sensor 45 do not comprise an important part of the subject invention, their description here is believed to be sufficient to show the relationship with the subject invention. Also, a drive shaft 54 is connected to the driving axle within the housing 15 by suitable means known in the art. It should now be noted that the one side of the front wheel axle assembly 14 connected by the aforedescribed suspension means namely the attached leaf springs 20 and 21 and the shock absorber means 31 to the chassis member 12 is symmetrical to the other side not shown in the drawings. Further during loading on the wheel axle assembly 14 the vehicle suspension means including support means 16 and 17, shock absorber means 21 and the locating rods 24, 24 and 25 permit the leaf springs 20 and 21 to move relative to the chassis member 12 about a longitudinal axis and/or a transverse axis of the chassis member 12.

Turning now to the rear driving wheel axle assembly 55 which comprises a rear axle housing 56 mounting at its outermost ends pneumatic wheels 56a. Spaced-apart support means are located longitudinally along chassis member 12 at the rearward end thereof and comprise a plurality of assembled shaped plate members in a suitable manner such as by welding. Specifically the forward support means of the rear axle assembly includes inner and outer plate members 57a and 57 best shown in detail in FIGURES 6 and 7. The plate members 57 and 57a are suspended from the chassis member 12 through a channel shaped member 58 secured to the chassis member 12. The inner and outer plates 57a and 57 are transversely spaced through two transverse plates 58a and 62a that also serve to mount the support pads 63 and 62 respectively. As best shown in FIGURE 6 the channel shaped member 58 is connected to the chassis member 12 through plate member 63.

The rearward support means of the rear axle assembly 55 comprises also an assembly of shaped plate members. Specifically the rearward support means comprises an outer plate 61 and an inner plate member 61a partially shown by the fragmentary view in FIGURES 1 and 8. Although the rearward support means is not shown in transverse detail as the front support means associated with the rear wheel axle assembly 55, it is sufficient to note here that the rear support means are similarly shaped as shown in FIGURES 1, 6 and 7 to suitably mount the two upper rear support pads 63 and the two lower support pads 62.

Upper and lower leaf spring assemblies 64 and 65 are assembled and attached to the rear axle housing 56 through a plurality of nut-bolt fasteners 66 and a securing plate 67 in a manner similar to the attachment of the front leaf spring assemblies 20 and 21. Specifically the lower leaf spring assembly 65 is referred to as the travel spring assembly and its outermost ends engage the two support pads 62 within the front and rear support means 57 and 61. The upper leaf spring assembly 64 is referred to as the load spring assembly and at its uppermost end engages the two upper support pads 63 within the front and rear support means 57 and 61. A spacer member 69 similar in size to the securing plate 67 is positioned between the upper and lower spring assemblies 64 and 65. The member 69 includes bored transverse openings for sliding engagement with the bolt fasteners 66. It should now be readily apparent that the inner and outer plates of the front and rear support means, namely, plates 57, 57a, 61 and 61a function similarly to the front axle assembly support means and that the leaf springs 64 and 65 are permitted to slidingly engage the surface of the support pads 62 and 63 during loading on the tires 56a such that the inner and outer plates 57, 57a, 61 and 61a limit the transverse movement of the leaf springs 64 and 65.

A somewhat U-shaped plate member 60 extends downwardly from chassis member 12 to provide a pivotal connection at one end for a hydraulic ram 68 pivotally connected at the other end to a dump body 13 for the dumping thereof. As best shown in FIGURE 6 the U-shaped plate member 60 provides a bifurcated bracket for one end pivotal connection of the ram 68 that comprises upwardly extending plate members 69a and 69b each having transverse openings therethrough for the assembly of bored members 69c and 72b. The bored members 69c and 72b are aligned and provide an assembly of a conventional pin to pivotally connect one end of the ram 68.

In order to maintain the longitudinal position of the rear axle assembly substantially between the front and rear support means a plurality of locating rods similar to those for the front axle assembly 14 are also provided. Specifically a lower locating rod 70 located at the outermost ends of the axle housing 56 and positioned vertically below the leaf spring assemblies 64 and 65 is universally connected at one of its opposite ends to a bifurcated bracket 73 integrally formed and extending forwardly of the axle housing 56. A bifurcated bracket 72 is formed a part of the U-shaped plate member 60 and is positioned inside of the other formed bifurcated bracket 69 previously described. The outer plate member 57 of the forward supporting means extends downwardly to form part of the bifurcated bracket 72 as shown in FIGURE 6. Another plate member 72a spaced transversely from the plate member 57 is shaped to extend upwardly as shown in FIGURE 6 and provides an opening for the securement of a bored member 72c that is in alignment with the other end of the bored member 72b secured at its other end by the plate member 57. As previously described the one end of bored member 72b is secured by the plate member 69a that forms part of the bracket 69. The lower locating rod 70 is then assembled by a conventional pin and ball joint connection to the bifurcated bracket 72 at its other end.

Although only partially shown in FIGURE 6 a transverse I-beam member 59 that is formed somewhat in an X-shape is connected from one of its leg portions to the chassis member 12 and by its other leg portion to the plate member 57 that is assembled to the U-shaped member 60. Specifically the transverse member 59 comprises upper and lower angle shaped flange members 59a and 59b and an intermediate V-shaped flange member 59c such that the members 59a, 59b and 59 are interconnected by a web or plate member 59d. At the transverse center of the transverse member 59, a bifurcated bracket 74, located on the rearward side as shown in invisible lines in FIGURE 6 and of similar shape to the bracket 30 on the front axle transverse member 19, provides a ball joint connection at one end through an assembled pin in a conventional manner for an upper locating rod 71. The other end of the upper locating rod 71 is pivotally connected at the transverse center of the rear axle housing 56 to a bifurcated bracket 75 extending upwardly and integrally formed therefrom. It should now be apparent that there are two outer lower locating rods 70 with only one being described similar to the front axle lower locating rods 24.

The two lower locating rods 70, and the upper locating rod 71 by virtue of their universal or ball joint connections permit movement of the leaf spring wheel axle assembly 55 engaging the support pads 62 and 63 about a longitudinal and a transverse axis of the vehicle chassis member 12. The locating rods 70, 70 and 71 are spaced parallel to each other and further geometrically spaced to define an isosoceles triangle when a vertical plane has passed therethrough. Thus it should now be apparent that the locating rods 70, 70 and 71 maintain the rear axle housing 56 substantially between the front and rear support means during any loading on the rear axle housing 56.

Although in the front wheel axle suspension, each shock absorber 31 is located between the wheels 15a and the leaf spring assemblies 20 and 21; the two rear shock absorbers 76 are each located between the upper locating rod 71 and the leaf spring assemblies 64 and 65. Rear shock absorber 76 has an identical purpose to that of the front shock absorbers 31 and comprises two telescopic cylindrical sections 77 and 78 with the section 77 being the large diameter. As best shown in FIGURES 7 and 8 the shock absorber section 77 is pivotally connected to the chassis 12 through a shaped channel member 80 suitably attached to the chassis member 12 and attached bracket 81 thereto. Bracket 81 includes an extension portion 82 providing a journal surface at its outer end for the pivotal connection of the extension portion 77a of the section 77. Bracket 81 is bolt fastened to the member 80. The other section 78 through its extension portion 78a is pivotally connected to the axle housing 56 through an integral bifurcated downwardly extending bracket 85 for the pivotal connection to the portion 78a through a conventional pin 84. Although only one side of the rear axle assembly 55 and its suspension to the chassis member 12 including transverse member 59 has been described, it is to be understood that the other side not shown is symmetrical thereto.

The rear and front shock absorbers 31 and 76 are identical in internal construction and now will be described in detail by referring to FIGURE 9 showing the details of the rear shock absorber 76. The outer and larger cylindrical section 77 includes downwardly extending piston rod 90 having a reduced portion 90a at its outermost end. The smaller cylindrical section 78 encloses a smaller and innermost cylinder 104. The smaller cylinder 104 is closed at both ends through ends 105 and an insertable stepped cylindrical plug member 107 securely fastened to the end of the cylinder 104 through an annular nut having outer annular threaded surfaces to engage corresponding inner threaded surfaces on the section 78. Since hydraulic fluid is provided within the innermost cylinder 104 an annular seal 108 is provided between the annular securing member 106 and the largest stepped portion of the plug member 107. Further the stepped member 107 has an internal bore permitting passage of the rod 90 and relative sliding movement therebetween.

A piston 91 having an outer diameter engaging the inner diametrical wall of the innermost cylinder 104 is formed as best shown in FIGURE 10 to have annular recessed surfaces on opposite piston faces with each recessed surface connected to the corresponding opposite piston face by diagonal passageways 96 and 100. Retainer member 92 is threaded upon the outermost end of the rod reduced portion 90a having threaded surface 93. A valve member 94 lies upon the outer retainer surface 92 such that the two members 92 and 94 are engaged by a coil spring 103 for urging them apart. Similarly an inner retainer member 97 abuts against the shoulder between the rod 90 and the reduced rod portion 90a. A valve member 98 slides upon the outer retainer surface of the member 97. Both members 97 and 98 are engaged by a coil spring 102 for urging them apart.

Further function of the ceil sprinp 103 is to seat the valve member 94 against a seat 95 formed on the recessed portion of the outer piston face to close the diagonal passageway 96. Similarly the other coil spring 102 serves to seat the valve member 98 against the seat formed on the recessed portion of the other piston face to close the diagonal passageway 100. It should now be apparent that with fluid contained on both sides of the piston 91 within the cylinder 104 and in the position as shown in FIGURE 9 that if the shock absorber 76 is extended pressure fluid from the upper end of the cylinder will communicate to the lower end of the cylinder; when the fluid pressure in passageway 96 acting on the valve member 94 exceeds the force the coil spring 103 exerts on member 94, thereby causing the valve member 94 to move away from seat portion 95. Similarly if the shock absorber 76 is retracted pressure fluid in the lower end of the cylinder 104 acting in passageway 100 to open the valve member 98 upon exceeding the predetermined force of spring 102 exerts on the valve member 98 to retain it against seat portion 101. It should now be readily apparent that the maximum extended length of the shock absorbers 31 and 76 correspond to the movement of piston 91 in the cylinder 104 from the end 105 to the closed end at the stepped member 107 thereof. Thus the shock absorbers 31 and 76 cooperate to downwardly limit the extended resilient movement of the front and rear leaf spring wheel axle assemblies 14 and 55 relative to the chassis member 12 during loadings thereon. It should be noted here that the oscillatory movement of the front wheel axle assembly 14 is limited by the securing plate 23 abuttingly engaging the chassis 12. The abutting engagement of the securing plate 23 occurs before the shock absorber rod portion 90a could abuttingly engage the closed end 105. Further the fluid contained on either side of the pistons 91 within the cylinder 104 acts to dampen the effect of the extended or retracted movements of the shock absorbers 31 and 76 and thereby to dampen the oscillatory movements of the front and rear wheel axle assemblies 14 and 15. Although applicants have illustrated one type of shock absorber, it should be readily apparent to those skilled in the art that other shock absorbers or their equivalents could be readily substituted to achieve the extension limiting purpose and further the dampening purposes thereof as aforedescribed.

Although in view of the aforedescribed description the operation should be readily apparent, the operation of the vehicle will be briefly summarized in connection with the rear axle assembly 56. The vehicle suspension means including the front and rear support means 57 and 61, the two lower locating rods 70 and upper locating rod 71, and the two shock absorbers 76 permit the axle housing 56 during loading thereon to move about a longitudinal axis and a transverse axis of the chassis member 12. The outer ends of the leaf springs 64 and 65 engage the surface of the support pads 62 and 63 during loading movement of the leaf springs relative to the chassis member 12. However, the transverse or lateral movement of the outermost ends of the leaf springs 64 and 65 is limited by the inner and outer plate members 57, 57a, 61 and 61a of the support means. Shock absorber 76 during loading movement of the springs 64 and 65 serves to dampen the loading movement relative to the chassis member and further to downwardly limit the extensible movement of the springs 64 and 65 relative to the chassis member. It should readily be apparent to those skilled in the art that the front axle assembly vehicle suspension operates in a similar manner.

Having described the invention what is desired to be protected and claimed by Letters Patent is:

In a road vehicle having a chassis frame member and a wheel axle assembly positioned below said chassis frame member and substantially transverse to the longitudinal axis thereof, said wheel axle assembly including transversely spaced apart leaf springs attached thereto, said attached springs including outermost ends; vehicle suspension means comprising support means, shock absorber means, a pair of first locating rods and a second locating rod, said support means being spaced apart longitudinally and securely attached to said chassis member, said support means slidingly engaging said outermost ends of said leaf springs to permit extensible and retractible movement of said axle assembly relative to said chassis member about a transverse and a longitudinal axis of said vehicle, said engaging support means being formed to limit excess transverse movement of said axle assembly, said pair of first locating rods each being universally connected at its opposite ends to one of said spaced apart support means and said wheel axle assembly, said second locating rod being universally connected at its opposite ends to the transverse center of said axle assembly and said chassis member, said first locating rods being positioned below said second locating rod and being parallel to each other, said first and second locating rods further being geometrically spaced in a vertical plane to substantially define an isosceles triangle, said first and second locating rods thereby permitting said movement of said axle assembly about said longitudinal and said transverse axis, said shock absorber means pivotally connected at its opposite ends to said chassis member and said axle assembly, said absorber means to limit the extensible movement of said axle assembly during loading of said chassis frame member.

References Cited by the Examiner

UNITED STATES PATENTS

| | | | |
|---|---|---|---|
| 1,411,640 | 4/22 | Menges | 267—44 |
| 2,176,978 | 10/39 | Northrup et al. | 267—19 X |
| 2,387,874 | 10/45 | Bradley | 267—56 X |
| 2,861,797 | 11/58 | Norrie | 267—44 X |
| 2,874,955 | 2/59 | McIntyre et al. | 267—8 |
| 2,955,842 | 10/60 | Stump | 267—66 X |
| 3,069,185 | 12/62 | Holmstrom | 267—66 X |

FOREIGN PATENTS 377,102   12/39   Italy.

ARTHUR L. LA POINT, *Primary Examiner.*

RICHARD C. RIORDON, *Examiner.*